United States Patent
Song et al.

(10) Patent No.: US 8,954,905 B1
(45) Date of Patent: Feb. 10, 2015

(54) METHODS FOR PHYSICAL LAYOUT ESTIMATION

(71) Applicants: Hurley Song, Saratoga, CA (US); Denis Baylor, Cupertino, CA (US); Matthew Robert Rardon, Dublin, CA (US)

(72) Inventors: Hurley Song, Saratoga, CA (US); Denis Baylor, Cupertino, CA (US); Matthew Robert Rardon, Dublin, CA (US)

(73) Assignee: Cadence Design Systems, Inc., San Jose, CA (US)

( * ) Notice: Subject to any disclaimer, the term of this patent is extended or adjusted under 35 U.S.C. 154(b) by 0 days.

(21) Appl. No.: 14/053,049

(22) Filed: Oct. 14, 2013

Related U.S. Application Data

(62) Division of application No. 13/357,390, filed on Jan. 24, 2012, now Pat. No. 8,560,984, which is a division of application No. 11/566,196, filed on Dec. 1, 2006, now Pat. No. 8,127,260.

(60) Provisional application No. 60/867,084, filed on Nov. 22, 2006.

(51) Int. Cl.
G06F 9/45 (2006.01)
G06F 17/50 (2006.01)

(52) U.S. Cl.
CPC .......... *G06F 17/505* (2013.01); *G06F 17/5081* (2013.01)

USPC .......... 716/103; 716/101; 716/104; 716/105; 716/119

(58) Field of Classification Search
CPC ............ G06F 17/5022; G06F 17/5031; G06F 17/5036; G06F 2217/84; G06F 17/5068; G06F 17/505; G06F 17/5009
USPC ......... 716/101, 103, 104, 105, 108, 113, 119, 716/126
See application file for complete search history.

(56) References Cited

U.S. PATENT DOCUMENTS

| | | | |
|---|---|---|---|
| 6,182,269 B1 * | 1/2001 | Laubhan | 716/113 |
| 6,732,340 B1 * | 5/2004 | Akashi | 716/113 |
| 7,000,202 B1 * | 2/2006 | Srinivasan et al. | 716/108 |
| 8,127,260 B1 * | 2/2012 | Song et al. | 716/106 |
| 2007/0234266 A1 * | 10/2007 | Chen et al. | 716/13 |

* cited by examiner

*Primary Examiner* — Jack Chiang
*Assistant Examiner* — Brian Ngo
(74) *Attorney, Agent, or Firm* — Alford Law Group, Inc.

(57) ABSTRACT

In one embodiment of the invention, a physical layout wire-load algorithm is used to generate a wire-load model based on physical data including aspect ratio and wire definitions defined in a physical library. The physical layout estimator is utilized to dynamically produce the physical layout wire-load model and to calculate net length and delay for each optimization iteration.

12 Claims, 9 Drawing Sheets

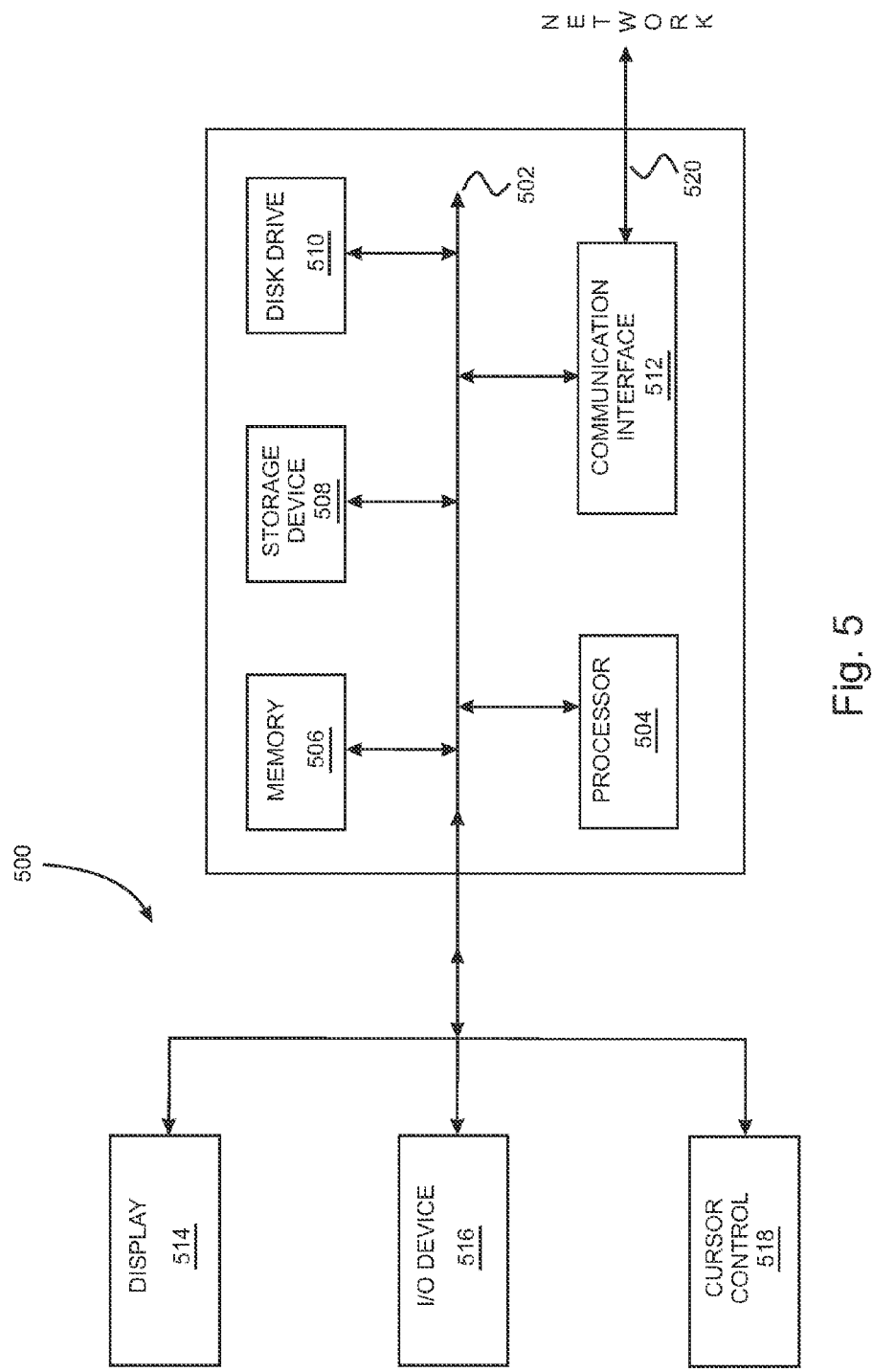

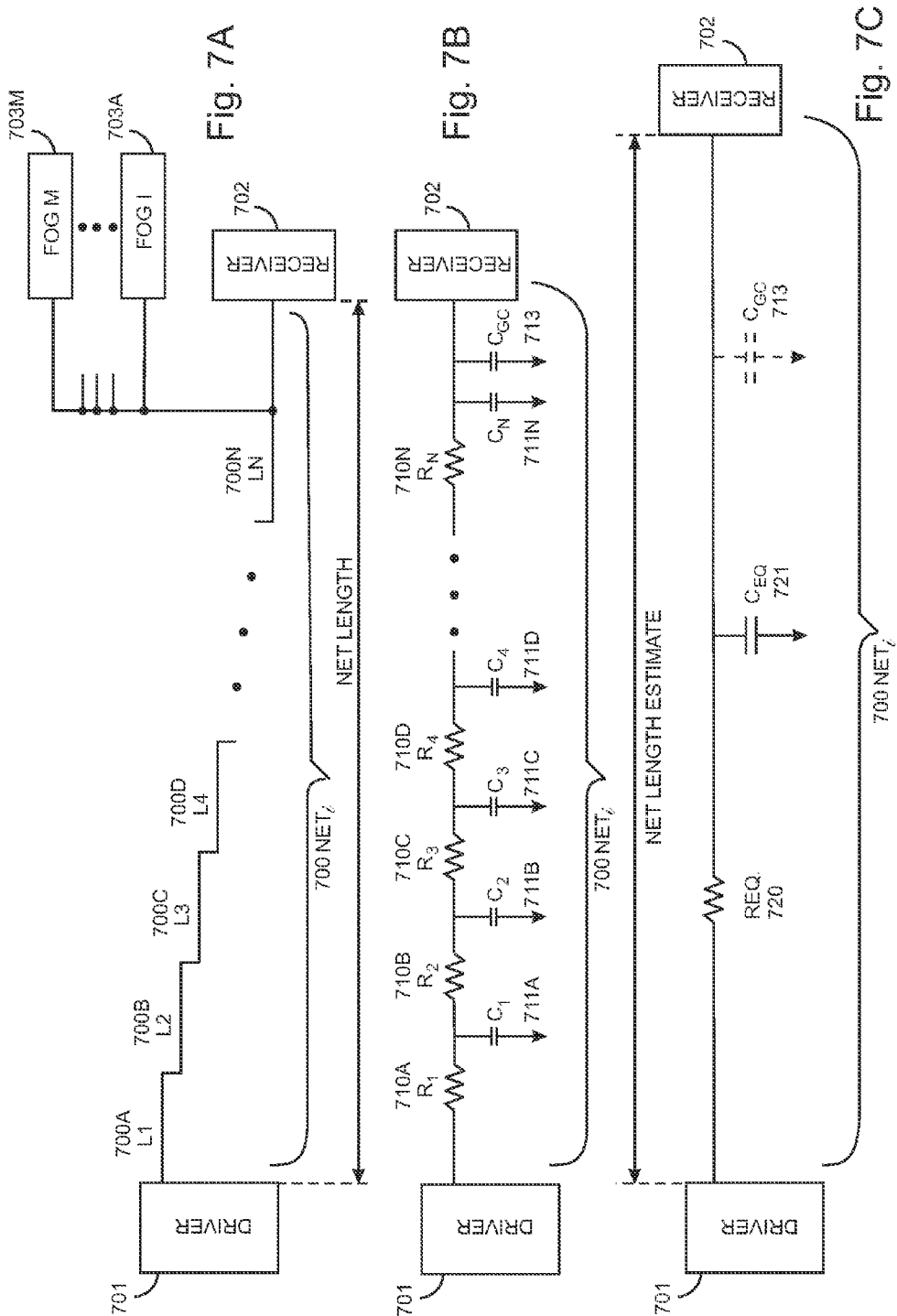

METHODS FOR PHYSICAL LAYOUT ESTIMATION

CROSS-REFERENCE TO RELATED APPLICATIONS

This non-provisional United States (U.S.) patent application is a divisional and claims the benefit of U.S. patent application Ser. No. 13/358,390 entitled METHODS AND SYSTEM FOR PHYSICAL LAYOUT ESTIMATION filed on Jan. 24, 2012 by Hurley Song et al., now issued as U.S. Pat. No. 8,560,984. U.S. patent application Ser. No. 13/358,390 is a divisional and claims the benefit of U.S. patent application Ser. No. 11/566,196 entitled PHYSICAL LAYOUT ESTIMATOR filed on Dec. 1, 2006 by Hurley Song et al., now issued as U.S. Pat. No. 8,127,260. U.S. patent application Ser. No. 11/566,196 claims the benefit of U.S. Provisional Patent Application No. 60/867,084 filed on Nov. 22, 2006 by inventors Hurley Song, et al., entitled PHYSICAL LAYOUT ESTIMATOR.

FIELD

The embodiments of the invention relate to electronic design automation. More specifically, the embodiments of the invention are related to physical layout estimation for timing delay calculations.

BACKGROUND

A simplistic view of electronic design automation may refer to inputting a Register Transfer Level (RTL) or behavior representation of a circuit into a synthesis tool to create a gate-level netlist representation of a circuit, (i.e., the logic and gates that will perform the desired functions outlined in the RTL). In other words, the synthesis tool takes the behavior requirements and determines what hardware to use. A wire-load model is used by a synthesis tool to estimate wire characteristics (e.g., interconnect delay) in the absence of physical layout data. For a wire with a given fanout, the wire-load model specifies the capacitance and resistance per unit area or length of the wire. The resulting timing of an integrated circuit that is responsive to the RTL and netlist is actually based upon the physical layout that is generated after placement and routing. However during the synthesis of the functional logic in the integrated circuit, a physical layout of the integrated circuit is typically unavailable.

Silicon foundries or cell library vendors may develop wire-load models based on statistical information taken from a variety of example designs. The example designs may test the wire characteristics at a variety of cell areas. That is, the wire-load model is typically an area-based wire-load model that is a function of the area of the design. There are several problems with this method of wire-load model generation.

An area-based wire-load model is based on the area consumed by the design. One problem with an area-based wire-load model supplied by the vendor is that area is typically the only one feature that may affect design timing given a synthesis library. Other physical factors may have an affect on the circuit timing or delay but are not accounted for in an area based wire-load model.

A second problem with the wire-load model generation is the vendor's assumptions and constraints when calculating the wire-load model are unknown and may not be applicable to the user's scenario or application. In other words, the conditions under which the wire-load model was calculated may be unsuitable for or incompatible with the user's circuit design. Users may blindly use the supplied wire-load model without any information as to how the model was obtained. Using a wire-load model without knowledge of how closely it relates to a design may lead to inaccurate delay calculations.

A third problem with the wire-load model generation is that vendors may choose a conservative or overly pessimistic wire-load model. That is, a vendor may choose a conservative capacitance value to represent an area which is greater than the capacitance value of most of the example designs that are in the area. However a conservative capacitance value may not be appropriate.

In addition to the wire-load model generation issues, there may also be problems with the way in which the wire-load model is utilized. A wire-load model may include a plurality of different tables based on the area of a circuit design. Even though, the area of the circuit design may change as the design is optimized. Usage in this manner does not take into account the changes in size or area during optimization. Changes in a circuit design during optimization, without re-evaluating how the wire-load model was used in timing delay calculations, may also result in inaccurate timing delays for the nets in the integrated circuit.

It is desirable to generate a more accurate wire-load model that may be used without some or all of the limitations of conventional techniques.

SUMMARY OF THE INVENTION

The embodiments of the invention are summarized by the claims that follow below.

BRIEF DESCRIPTION OF THE DRAWINGS

The embodiments of the invention will be readily understood by the following detailed description in conjunction with the accompanying drawings.

FIG. 5 illustrates an exemplary computer system suitable for physical layout estimation.

FIGS. 7A-7C illustrate various representations of an exemplary net of a netlist between a driver and a receiver.

DETAILED DESCRIPTION

Figure 1A:
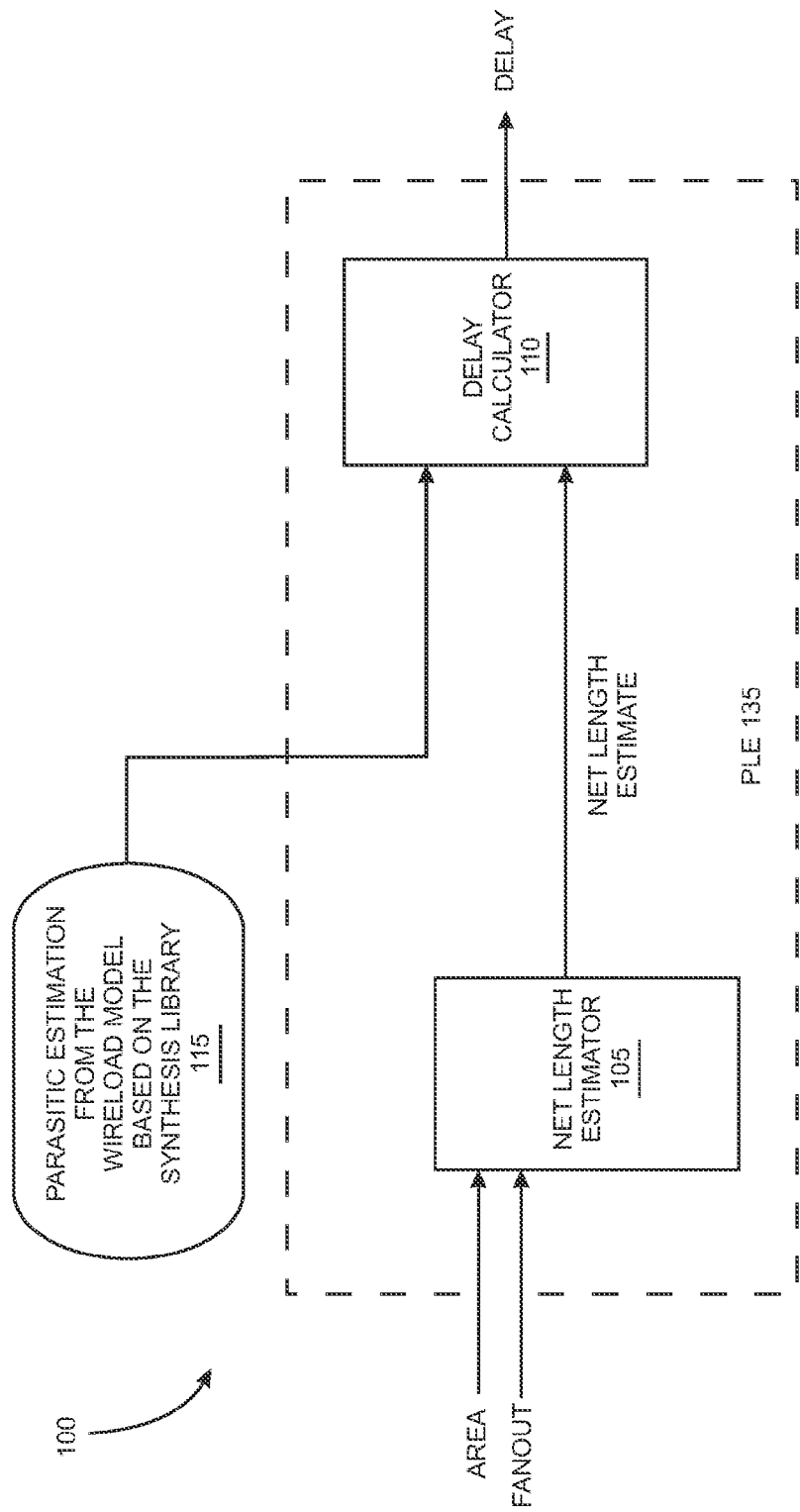
FIG. 1A illustrates an exemplary delay calculation using an area-based wire-load model.

The invention may be implemented in numerous ways, including as a system, a process, an apparatus, or as computer program instructions included on a computer readable medium such as a computer readable storage medium or a computer network wherein program instructions are sent over optical or electronic communication links.

A detailed description of one or more examples is provided below along with accompanying figures. The detailed description is provided in connection with such examples, but is not limited to any particular embodiment. The scope is limited only by the claims and numerous alternatives, modifications, and equivalents that are encompassed by the claims. Numerous specific details are set forth in the following description in order to provide a thorough understanding. These details are provided for the purpose of example and the described embodiments of the invention may be implemented according to the claims without some or all of these specific details. For the purpose of clarity, technical material that is known in the technical fields related to the embodiments of the invention has not been described in detail to avoid unnecessarily obscuring the description of the embodiments of the invention.

In accordance with a first aspect of the embodiments of the invention, a method of creating a physical wire-load model includes creating a dynamically calculated wire-load model based on aspect ratio.

In accordance with a second aspect of the embodiments of the invention, a method of calculating delay includes using a dynamically calculated physical wire-load model based on aspect ratio.

Broadly speaking, the embodiments of the invention provide systems, methods, and apparatus for a physical layout estimator. It should be appreciated that the embodiments of the invention can be implemented in numerous ways, including as a method, a system, or a device. Other aspects and advantages of the invention will become apparent from the following detailed description, taken in conjunction with the accompanying drawings, illustrating by way of example the principles of the embodiments of the invention.

With the embodiments of the invention in mind, it should be understood that the invention may employ various computer-implemented operations involving data stored in computer systems. These operations are those requiring physical manipulation of physical quantities. Usually, though not necessarily, these quantities take the form of electrical or magnetic signals capable of being stored, transferred, combined, compared, and otherwise manipulated. Further, the manipulations performed are often referred to in terms, such as producing, identifying, determining, or comparing.

Any of the operations described herein that form part of the invention are useful machine operations. The invention also relates to a device or an apparatus for performing these operations. The apparatus may be specially constructed for the required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

Generally, a design process for an integrated circuit may include synthesis, place and route, verification, and optimization. A synthesis tool may take a Register Transfer Level (RTL) description or a high-level description language (HDL) of a circuit design and convert it to a netlist or gate level description of the circuit design. In other words, the synthesizer may take a functional description of a circuit design and determine the gates, macros, and interconnects required to perform the described function. Macros may be referred to as non-boolean devices such as memory or a multiplier. The gate level description then may go through place and route to generate the layout of mask layers for the circuit design. That is, the gates, macros, and wires/interconnects may be physically positioned in the cell. The physical position of electronic devices and wires may have an impact on the timing of the design. Timing may also be referred to as delay calculation, delay, or timing delay. During verification, the design may be tested for timing delay and functional accuracy. Delay calculations may analyze the timing of the physical design, whereas functional accuracy may test that the design performs as desired. Optimization may occur when the delay and/or functional verification do not produce the desired results. That is, the circuit design may undergo iterations of changes (i.e., optimization) in the instantiation of gates, modules, blocks, macros, and nets of interconnect to improve the timing delay or function.

A wire-load model is what the synthesis tool may use to estimate wire characteristics for a given design. Wire characteristics may also be referred to as wire parasitics, resistance and capacitance, or "RC". Since the gates and wires have not yet been positioned by placement and routing at the time of synthesis, the wire-load model estimates what the wire characteristics or parasitics may be for a given design. A wire-load model may be based on a synthesis library and may be created by and supplied by a cell library vendor for use by all users. A wire-load model may include resistance values and capacitance values per units of wire area, such as a square micron, or per units of length given a minimum width.

One example method that silicon foundry or cell library vendors may use to calculate wire-load models may include plotting the number of nets with a given capacitance as a histogram. For all the nets with a particular fanout and area, a single capacitance value may then be chosen from the histogram to represent this fanout value in the wire-load model. Alternatively, a vendor may supply an area-based wire-load model in which a family of wire-load models is included, each member of the family may be used for a design of a different area.

Referring now to FIGS. 7A-7C, various representations of an exemplary net NETi of a netlist between a driver 701 and a receiver 702 are illustrated. Some embodiments of the invention, operate on nets similar to the exemplary net NETi illustrated in FIG. 7A to generate a physical wire-load model, such as the exemplary physical wire-load model illustrated in FIG. 7C.

In FIG. 7A, the exemplary net NETi 700 is illustrated as having a plurality of different layers of wire interconnect 700A-700N between the driver 701 and the receiver 702. In addition to the receiver 702, one or more additional fanout gates (FOG1-FOGM) 703A-703M may be coupled to the exemplary net NETi 700.

Each of the different layers of wire interconnect may have a different minimum width specification. Additionally, they may have a different parasitic resistance per square and a different parasitic capacitance per square due in part to the varying material that may be used, thickness, and insulating dielectric layers and thicknesses between each when manufactured in a wafer fabrication facility or silicon foundry.

FIG. 7B, given the minimum widths, is a schematic representation of the different parasitic resistance per length and the different parasitic capacitance per length for the differing layers of wire interconnect in the exemplary net NETi 700. For each layer of wire interconnect 700N, there is a parasitic resistance per length 710N and a parasitic capacitance per length 711N. For example, in the first layer of wire interconnect 700A with a first net length, the parasitic resistance R1 710A is instantiated in series between terminals of the net, and the parasitic capacitance C1 711A instantiated with one terminal coupled to the net and one terminal coupled to ground. This results in the parasitic resistances (R1-RN)

710A-710N being coupled in series together along NETi 700 between the driver and the receiver and the parasitic capacitances (C1-CN) 711A-711N shunted to ground having one terminal coupled to a node along NETi and an opposite terminal coupled to ground as illustrated in FIG. 7B.

Additional load capacitance may be applied to the exemplary net NETi 700 from the net fanning out to fanout gates 703A-703M. The net wiring load from the branches to the fanout gates may be considered to be part of one or more of the parasitic capacitances C1-CN 711A-711N. A gate capacitance load $C_{gc}$ 713 from the receiver 702 and the fanout gates 703A-703M may be lumped together with one terminal coupled to NETi 700 near the receiver and the opposite terminal coupled to ground. The gate capacitance load $C_{gc}$ 713 can readily be determined by summing the gate capacitive load information from the physical library for each of the gates coupled to the net. Alternatively, instead of being lumped together, the gate capacitance load $C_{gc}$ 713 may be distributed across the one or more different wire interconnect layers to which the fanout gates may couple.

Besides the wire resistance and capacitance, additional parasitic resistances and capacitances may be considered and added to the net, such as contact resistance and overlap capacitances. However for simplicity, the significant wire resistance and capacitance my alone be considered.

These parasitic resistances and capacitances, as well as the load capacitance, can be modeled by a physical wire-load model to simplify the timing delay calculations of signals that propagate from the driver to the receiver.

FIG. 7C illustrates a schematic of a simple exemplary physical wire-load model having an equivalent resistor Req 720 and an equivalent capacitor Ceq 721 that respectively have a resistance and a capacitance that are based on the physical library and may be functions of a net length estimate for the given NETi 700. The equivalent resistor Req 720 and capacitor Ceq 721 model the (RC) timing delay that may be seen in the given net NETi 700 based on various factors. The respective values of the resistance and capacitance for the equivalent resistor Req 720 and capacitor Ceq 721 may be algorithmically computed by one or more equations or presented as look-up tables that are then indexed by given factors of the net, such as the net length estimate. The gate capacitance load $C_{gc}$ 713 from the receiver and fanout gates may be added into the equivalent capacitor Ceq 721 or may optionally be maintained as a separate capacitance, as illustrated in FIG. 7C, because it is not a function of the net length estimate but instead is a function of the logic gates or cells to which the net couples. Additionally, the net length estimates may differ from actual net lengths, as illustrated by comparing FIGS. 7A and 7C, due to added parasitic capacitances.

While FIG. 7C illustrates a simplified physical wire-load model, more complex models may be used such as a pi-load model disclosed in U.S. patent application Ser. No. 10/735,123, entitled Robust Calculation of Crosstalk Delay Change in Integrated Circuit Design, filed by Igor Keller et al. on Dec. 12, 2003, which is incorporated here by reference.

The physical layout estimator may be operated in different modes in determining delay estimates in the net segments of the netlist in some embodiments of the invention. Alternatively in a number of embodiments of the invention, the physical layout estimator may operate in modes that determine delay estimates based on the parasitics of the physical cell library or parasitics that may be extracted from a placed and routed IC design. In these cases, physical characteristics of the physical cell library may be considered, the floor plan of the IC design may be considered, and/or placement and routing information may be considered.

FIG. 1A illustrates an exemplary delay calculation 100 performed by a physical layout estimator 135 using an area-based wire-load model based on the synthesis library in one mode of operation. To perform the delay calculation 100, the physical layout estimator 135 may include a net length estimator 105 and a delay calculator 110. Design area and fanout information may be coupled into net length estimator 105. The design area may be the physical area occupied by a design, such as a cell, a block, a macro-cell, or other functional block in the IC design hierarchy. Fanout is the number of gates or receivers that are driven on a net by a driver. In some embodiments of the invention, fanout may be determined by counting the total number of pins or connectors on a give net in the design and subtracting one for the driving pin. The net length estimator 105 may estimate the length of a net, a net length estimate, which may be coupled into the delay calculator 110. A synthesis library based wire-load model 115 may be used to estimate the parasitic effects of the wire in the design, and may be coupled into the delay calculator 110. The delay calculator 110 outputs a timing delay value for the given net. However, this timing delay value may not be very appropriate for the design as the wire-load model is based on the synthesis library which lacks physical design information.

The silicon foundry or cell library vendor may supply the wire-load model from the synthesis library. The synthesis library may not have any location or routing information, and thus is void of actual physical data. Thus, the synthesis library based wire-load model may not take into account several physical features of the design that affect delay along a net. Moreover, the synthesis library based wire-load model may be overly conservative and therefore, inappropriate for a users design. Thus, the resulting delay calculation may be inaccurate, causing the design optimization to be suboptimal.

Delay calculation 100 may be used to determine the delay for each design optimization. However, the synthesis library based wire-load model may only be referred to once during the design process, unless an area boundary is crossed. That is, even though the area of the design may change during optimization, the parasitic estimation from the synthesis library based wire-load model is not updated. For example, RTL design ABC may generate an estimation X for wire parasitics. Comparing the result of delay calculation 100 to the design requirements may reveal that the timing requirement may not be met. Optimization may occur creating design ABCD which may have a greater area than design ABC. However, parasitic estimation X obtained for the ABC design may be utilized in the delay calculation for optimized design ABCD, causing inaccurate delay calculation for design ABCD.

In other modes of operation, the physical layout estimator 135 uses a physical wire-load model that considers physical design information to determine the delay value for the nets.

Figure 1B:
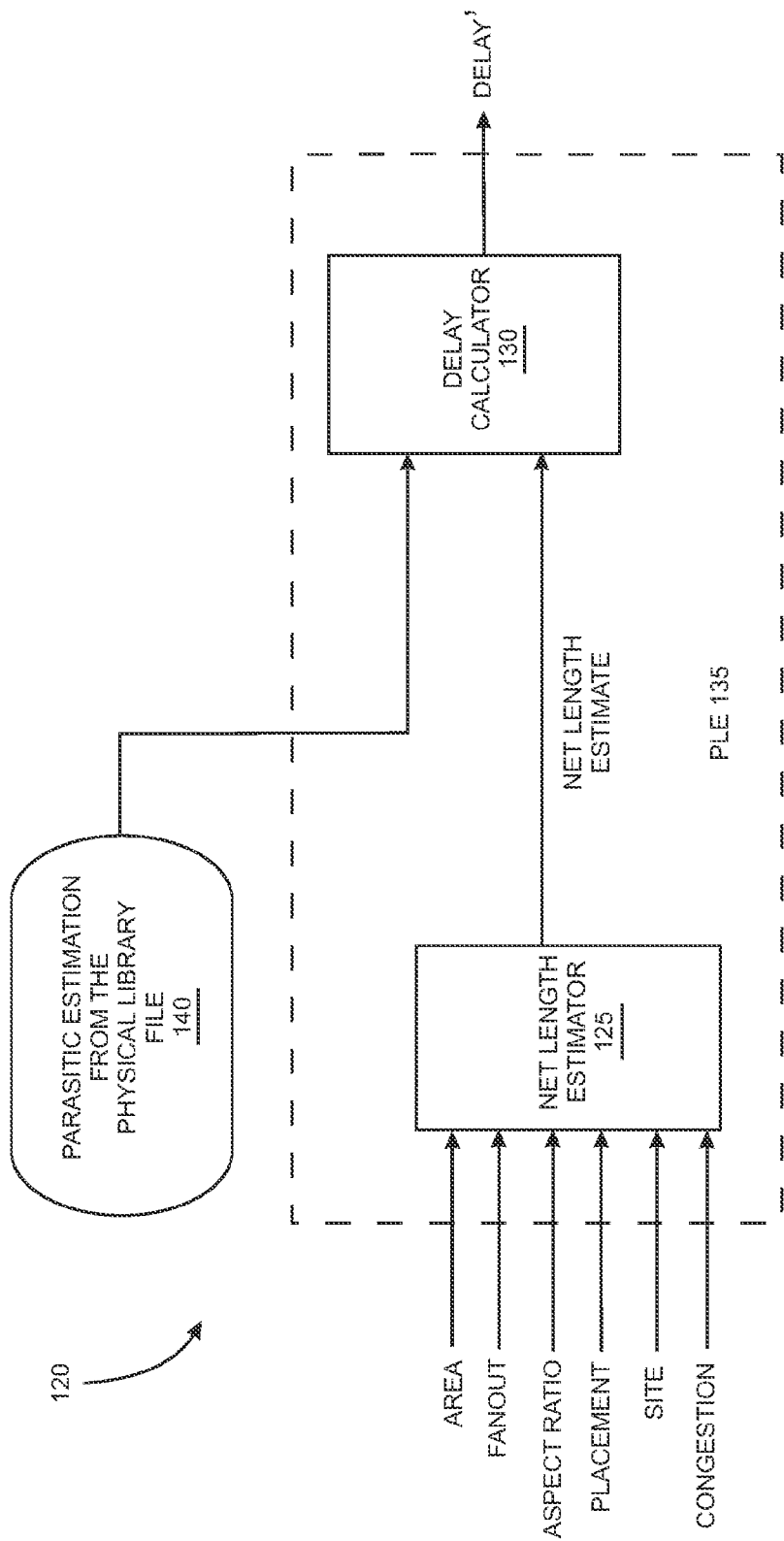
FIG. 1B illustrates an exemplary delay calculation using a first physical layout estimated wire-load model.
Figure 1C:
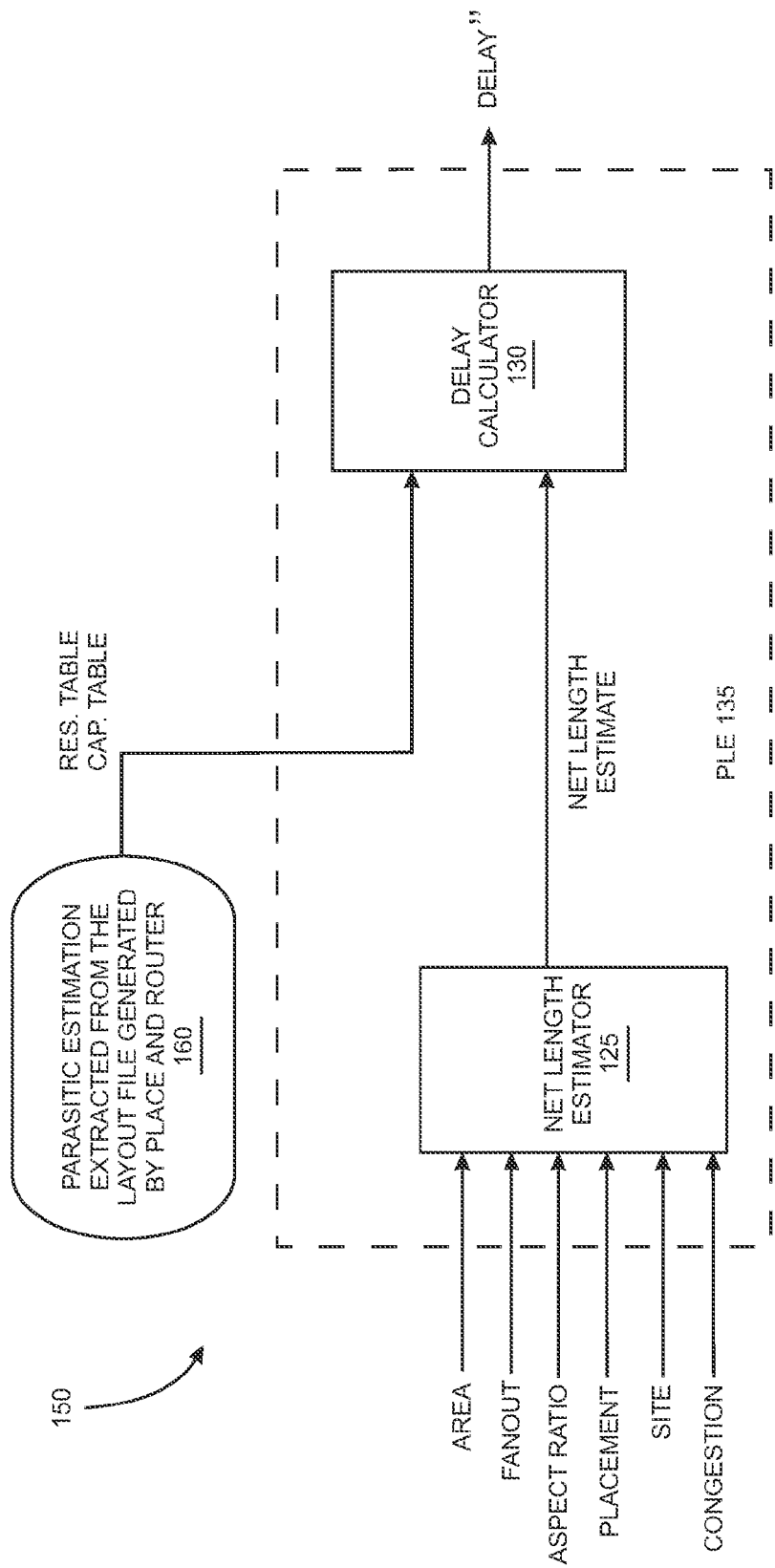
FIG. 1C illustrates an exemplary delay calculation using a second physical layout estimated wire-load model.

FIG. 1B illustrates an exemplary delay calculation 120 using a physical layout estimated wire-load model 140 in accordance with embodiments of the invention. The physical layout estimator 135 may include a net length estimator 125 and a delay calculator 130. In some embodiments of the invention, the physical layout estimator need only compute a net length estimate and thus may exclude the delay calculator 130. The net length estimate may be used for other purposes, such as for calculating the net area.

The net length estimator 125, in addition to using the area and fanout information, may also make use of other information to generate a net length estimate, such as aspect ratio information. The aspect ratio may refer to the ratio of the height to width of a cell, a block, a macro-cell, or other module of hierarchy in the IC design. In other embodiments of the invention, the aspect ratio may be inverted to be the ratio of the width to the height of a cell, a block, a macro-cell, or other module of hierarchy in the IC design. Additionally, the aspect ratio may provide more information to the net length estimator 125 than just area of a cell, a block, a macro-cell, or other module of hierarchy in the IC design. The aspect ratio may also indicate the dimensions of the cell, the block, the macro-cell, or other module of hierarchy in the IC design. For example, the aspect ratio may indicate a shape similar to a square or a long and thin shape. Different shapes of a cell, a block, a macro-cell, or other module of hierarchy in the IC design can generate different net length estimates and different parasitic effects.

In addition to the aspect ratio, the height and width information of a cell, a block, a macro-cell, or other module of hierarchy in the IC design may be coupled into the net length estimator 125 in some embodiments of the invention to acquire a net length estimate for a given net.

In some embodiments of the invention, placement information, if available may also be input into net length estimator 125. Placement information may refer to location information, or relative location information of electronic elements such as gates, macros, interconnects, and wires. That is, placement information may include position information such as the quadrant where the element is located in the circuit design. For example, placement information may indicate upper left quadrant, upper right quadrant, lower left quadrant, or lower right quadrant. Location information may also include position in relation to blockages, macros, or pin locations. Blockages may refer to cells creating an obstruction such as those created by the placement of circuit blocks, reserved channels and routing, pre-existing power and ground terminals, or one of several other microprocessor components, along the path between two points. Macros or macro-cells may refer to large circuit elements designed to perform a specific function such as a memory or a multiplier.

Some location information, such as pin location information relative to the cell, block, macro-cell, or other hierarchical level may be obtained from the physical library and coupled into the net length estimator. However, pin locations typically refer to the physical location of the connections to a cell, block, module or macro relative to the overall circuit or layout. If pin location information is unavailable, the center of the cell, block. macro-cell, or other level of hierarchy may be used instead.

A site, which is defined along with the rest of the technology information in the physical library, is the basic building block that is used to define the placement grid. A placement grid, which defines the legal locations for cells, is a 2 dimensional array that is constructed by creating a regular array of sites. The site, being the basic unit of the placement grid, can thus serve as a basic unit of physical area. The site information may also be coupled into the net length estimator.

The physical library may also be referred to as a place and route library and includes a technology file regarding the characteristics of the silicon foundry and the parasitics per unit typically measured from test devices.

In some embodiments of the invention, congestion information may be included as an input into net length estimator 125. Congestion information may refer to the quantity of wires and or the quantity of other electronic elements in the design or specific areas of the design. In one embodiment of the invention, a higher congestion level indicates a higher parasitic effect and a lower congestion level indicates a lower parasitic effect.

Net length estimator 125 may calculate a net length estimate for each given net in the netlist. The net length estimate generated by the net length estimator 125 may be used as an input into the delay calculator 130. The physical wire model 140, from which parasitics can be estimated given the net length, may be based on physical data obtained from the physical library as is described further below with reference to FIG. 2. The information of the physical wire-load model 140 is coupled into the delay calculator 130.

Figure 8:
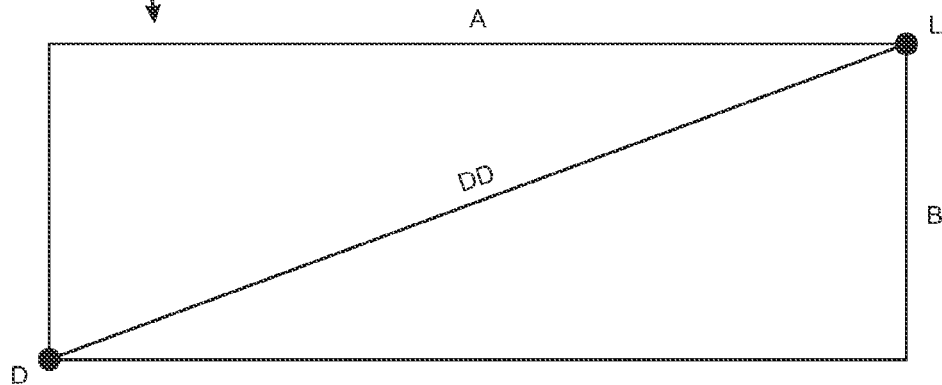
FIG. 8 illustrates an exemplary diagram for computing the net length estimate as a function of varying inputs.

Referring now to FIG. 8, a diagram illustrating the computation of net length estimate (NLE) without placement information is illustrated. A block 800 is illustrated having an area and aspect ratio which establishes distances A and B around the perimeter of the block. The block 800 includes a driver illustrated at node D and a receiver/load illustrated at node L at the periphery. The diagonal distance DD between node D and node L is used in the net length estimate given the aspect ratio and the area of the block. Net fanout from the driver (FO) is also included in the net length estimate by a log base 2 function. The net length estimate may also include an element that is a function of the site information. The net length estimate may be increased by a function of the wiring congestion within the block 800. Given these variables, an equation for the net length estimate (NLE) may be formed as follows, where K is a constant:

$$NLE=K(DD)\log_2(FO+1)f(\text{site})g(\text{congestion})$$

Otherwise, if placement information is available, a "Steiner Tree" may be used to determine the net length estimate between a driver and one or more receivers. (See page 111 in "Algorithms for VLSI Physical Design" by Naveed A. Sherwani, Copyright 1999 by Kluwer Academic Publishers. 5th Printing 2003).

Figure 2:
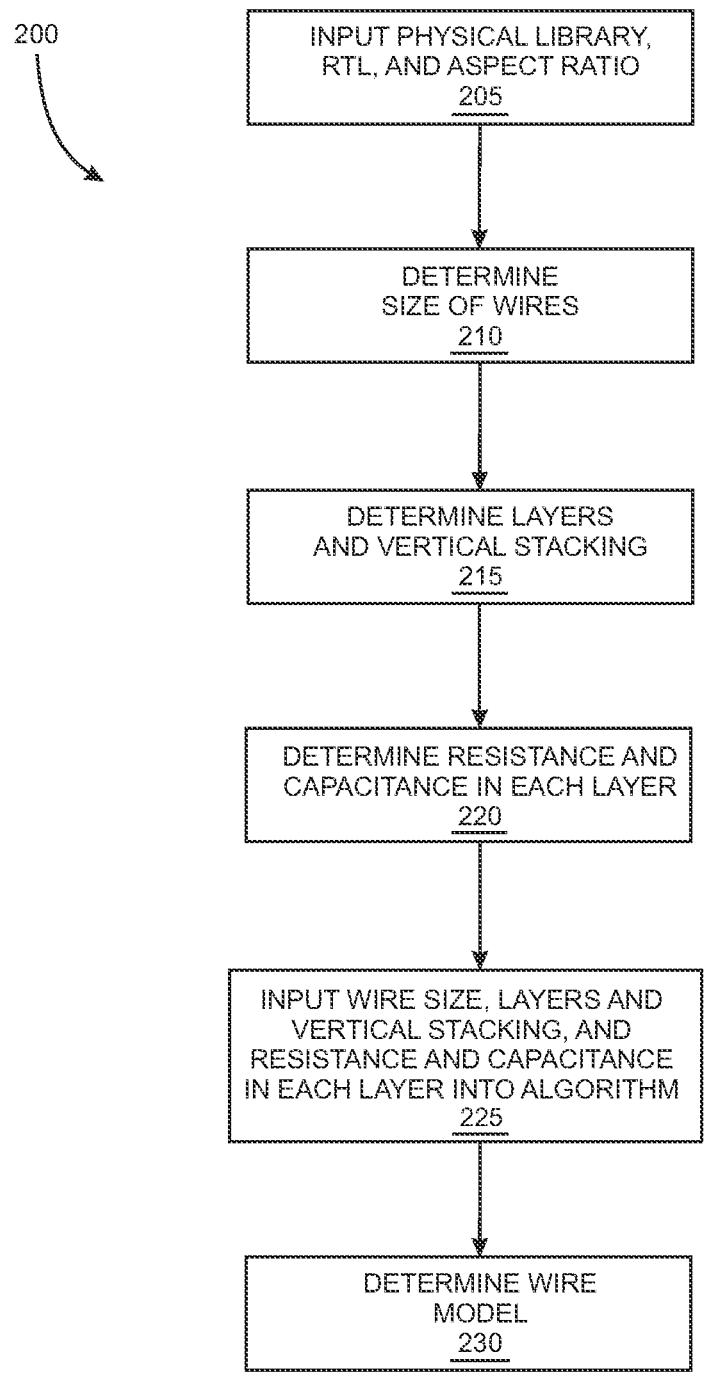
FIG. 2 illustrates an exemplary process for wire-load model generation using physical layout estimation.

Referring now to FIG. 2, an exemplary process 200 is illustrated for the generation of a physical wire-load model using physical layout estimation. That is, prior to using a physical wire-load model, the physical wire-load model is generated or characterized using certain information, such as the physical library information. The generic physical wire-load model that is generated as an algorithm or one or more look-up tables, is later used to calculate a specific physical wire-load model for each given net in a netlist.

In process action 205, the physical library information provided by the venders, the RTL or netlist circuit representation, and the aspect ratio may be received by the physical wire-load model generation algorithm.

In process action 210, the minimum widths of the wire interconnect at each layer is extracted or parsed from the physical library information.

In process action 215, the layers of material are extracted or parsed from the physical library and their vertical stacking is determined. In particular, the layers of wire interconnect, typically conductive material layers such as metal, are extracted or parsed from the physical library that may be used to form nets of the netlist.

In process action 220, the parasitic resistance per unit area or length and parasitic capacitance per unit area or length for each layer of wire interconnect are extracted or parsed from the physical library.

In process action 225, the minimum width of the wires, the layers and vertical stacking, and the parasitic resistance and parasitic capacitance in each layer may be used as factors in the physical wire-load model generation algorithm.

In one embodiment of the invention, the parasitic resistance and parasitic capacitance of each wire interconnect layer and the minimum width of the wires for each layer are the lone factors in the physical wire-load model generation algorithm. For example, an average parasitic capacitance per unit length is determined for all of the wire interconnect layers assuming that they are to be routed at their minimum widths. Similarly, an average resistivity per unit length is determined for all the wire interconnect layers assuming they are to be routed at their minimum widths. Thus, to determine the parasitic resistance and capacitance of a given net, its net length is the variable that is used given the average parasitic resistance and capacitance per unit length. In this case, the net length estimate may be adjusted for other factors, such as area, fanout, aspect ratio, height and width, placement/location, and/or congestion so that an equivalent parasitic resistance and parasitic capacitance of each net may be formed.

In process action 230, the physical wire-load model is generated in response to the various factors that are available. In some embodiments of the invention, the physical wire-load model is maintained as one or more algorithms or equations with variable inputs to determine the parasitic resistance and capacitance for a given net. In other embodiments of the invention, the physical wire-load model is maintained as a set of look-up tables, such as a parasitic capacitance table and a parasitic resistance table that are indexed by the specific factors of a given net, such as net length, to determine the parasitic resistance and capacitance for the given net. As an algorithm, the physical wire-load model may save memory. As a set of look-up tables, the physical wire-load model may provide quick access.

Figure 3:
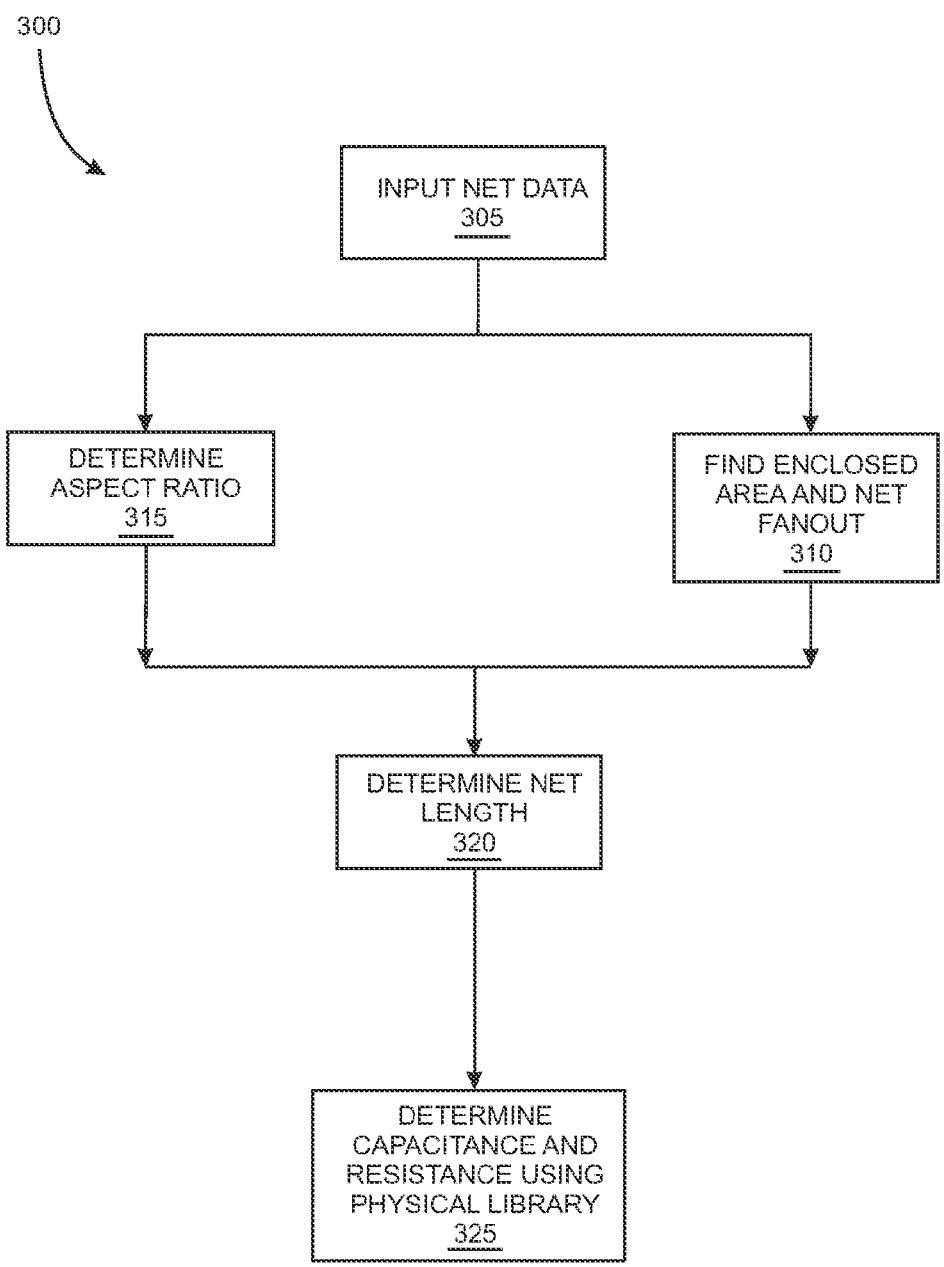
FIG. 3 illustrates an exemplary process for a wire-load model algorithm.

Referring now to FIG. 3, an exemplary process 300 is illustrated for calculating the physical wire-load model for a given net.

In process action 305, the information about a given net, the net data, is gathered or received. The net data may include fanout related information of the given net and hierarchical location of the net in the integrated circuit design from the netlist.

In process action 310, the width and height of the cell, block, module or macro for the driver and receiver is parsed from the physical library and its enclosed area is determined by multiplying the width and height together. The gate fanout of the given net may be determined by summing all the pins connected to the given net and subtracting one for the driver.

In process action 315, the aspect ratio may be determined by dividing the width by the height or dividing the height by the width parsed from the physical library for the block, module or macro or otherwise estimated if the enclosed area is provided.

In process action 320, the net length estimate may be calculated based in part on the aspect ratio of the cell, block, module or macro for the driver and receiver. Other factors influencing the net length estimate may include height and width information, enclosed area information, and placement information of the cell, block, module, or macro-cell for the driver and receiver, as well as congestion information of the given net. The placement information and congestion information may be generated by a floorplaner and/or a synthesizer.

In process action 325, the physical wire-load model may be calculated. The wire-load model may include finding the capacitance and resistance based on the physical library. In some embodiments of the invention, the physical wire-load model capacitance and resistance are determined per unit length of a minimum net width. In this case, the resistance and capacitance of the physical wire-load model may be calculated by multiplying the net length estimate together with the respective values for resistance ad capacitance per unit length of the minimum net width. In some embodiments of the invention other parasitic values may affect the capacitance and resistance values.

Figure 4:
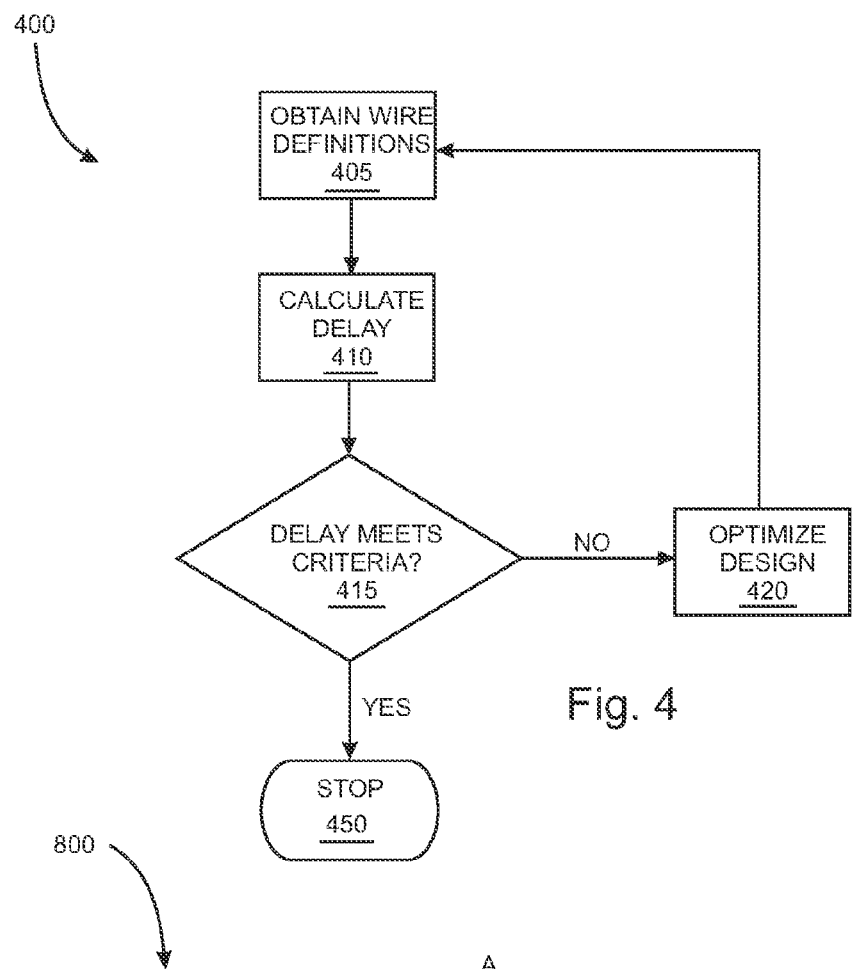
FIG. 4 illustrates an exemplary process for physical layout estimator wire-load model use.

FIG. 4 illustrates an exemplary process for using a physical wire-load model with the physical layout estimator. In process action 405 the physical wire-load model may be calculated such as described in process 300 in FIG. 3. As previously described, the aspect ratio, the physical library, and the RTL representation of the design may be input into the model generation algorithm to calculate the physical wire-load model.

In process action 410, the RC timing delay may simply be estimated for the simplified physical wire load model illustrated in FIG. 7C by multiplying the calculated resistance and capacitance of the physical wire-load model together, in one embodiment of the invention. As discussed previously, the resistance and capacitance of the physical wire-load model may be calculated by multiplying the net length estimate together with the respective values for resistance and capacitance per unit length of the minimum net width. Recall that the physical wire load model is based in part on the parasitic estimation from the physical library (i.e., the parasitic estimate obtained from the wire definitions defined in the physical library information).

Process action 415 determines if the delay calculation meets the requirements of the design. If the delay calculation meets the requirements of the design, the process may stop at process action 450 for the given net. However, if the delay is determined to not meet the design requirements, the design may go through an optimization process with an optimizer in the synthesizer.

In process action 420, the design is to be optimized as the estimated timing delay for the given net did not meet design specifications. Optimization may refer to modification, alteration, or change to the design with the intent of modifying the resulting delay calculation. In some embodiments of the invention, the optimization may affect the position of the cells. In some embodiments of the invention, the optimization may affect the position of the wires. In some embodiments of the invention, the optimization may affect both the position of the wires and the position of the cells, modules, and/or macros of the IC design. In some embodiments of the invention, the optimization may affect the type of gates selected for use or the implementation. In other embodiments of the invention, the optimization may affect the position or selection of multiple elements of the design.

Once the design is optimized, process 400 returns to process action 405 to create a new physical wire-load model based on the optimized net list. The optimization step, 420, may have caused a change in area or aspect ratio. As a result process 400 may return to process step 405 to calculate a new physical wire-load model using the RTL optimized netlist description and the aspect ratio of the optimized design, in addition to the physical library.

The new wire-load model may be generated in process action 405. Process action 410 may calculate the delay for the optimized design using parasitics obtained from the physical wire-load model and the net length estimate for the optimized design. That is, the area, fanout, and aspect ratio of the optimized design may be input into a net length estimator to estimate the net length of a given net in the optimized design. The net length estimate for a given net may be used in the delay calculation along with the parasitic estimation from the wire-load model generated for the optimized design. If the optimized design meets the design criteria, process 400 stops. However, if the optimized design does not meet the delay criteria, the design may go through another round of optimization. Optimization may be repeated until the desired delay for the design is achieved.

The wire-load model may be dynamically generated for each optimization iteration. That is, upon the design being optimized, the optimized aspect ratio may be used as an input into physical wire-load model generating process 200 to generate a custom wire-load model for the optimized design. The custom and dynamically generated wire-load model may be used to provide a custom and dynamically generated parasitic estimation for the wires in the optimized design. The custom and dynamically generated parasitic estimation may be used in the delay calculation to provide a more accurate delay calculation for the design.

In addition, the physical information of aspect ratio, placement information and congestion information may be used as inputs into the net length estimator to estimate a net length based on actual physical design information providing a more accurate net length estimate which will result in a more accurate delay calculation.

Figure 6:
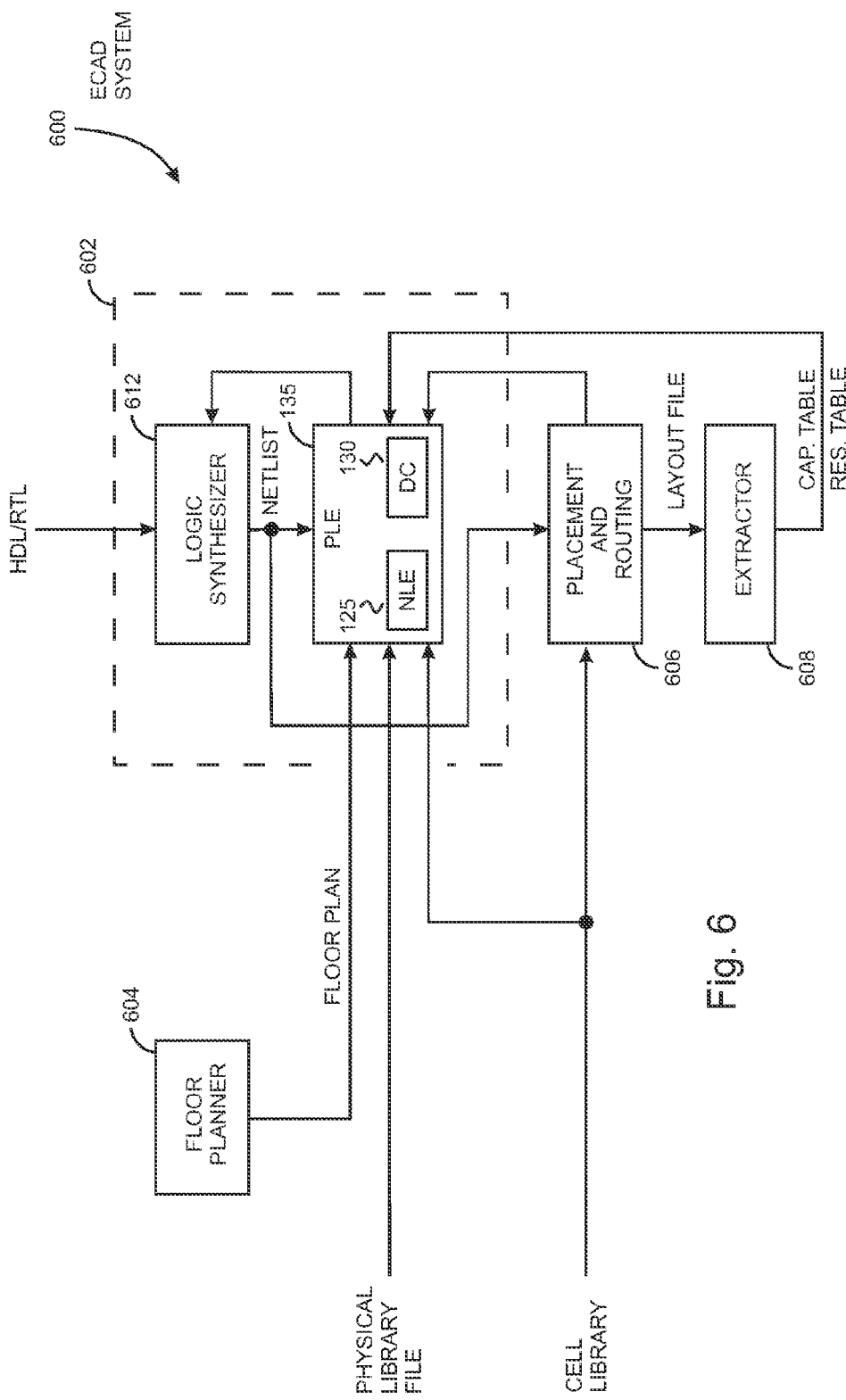
FIG. 6 illustrates an exemplary electronic computer aided design system including a synthesizer for physical layout estimation.

Referring now to FIG. 6, an electronic computer aided design (ECAD) system 600 is illustrated. The ECAD system 600 may include a synthesizer 602, a floorplaner 604, a placer and router 606, and an extractor 608 coupled together as shown. The synthesizer 602 includes a logic synthesizer 612 and a physical layout estimator (PLE) 135. The physical layout estimator 135 includes the net length estimator (NLE) 125 and the delay calculator (DC) 130.

The logic synthesizer 612 receives a high-level description language (HDL) or register transfer logic (RTL) description of the functionality of an integrated circuit design to generate a netlist description of the integrated circuit. The netlist describes the Boolean and non-boolean logic cells, blocks, and modules that are to be used in the design of the integrated circuit. The physical layout estimator 135 receives the netlist from the logic synthesizer 612, the floorplan from the floorplanner 604, and a cell library including the physical library file for a silicon foundry and the layout of the logic gates.

The placer and router 606 receives the netlist and the cell library, including the layout of the logic gates and the physical library file, to generate a layout file of the integrated circuit in response to the netlist. The layout file generally describes the mask layers that may be used to manufacture the integrated circuit.

The extractor 608 receives the layout file and may generate one or more capacitance tables and one or more resistance tables from the actual layout of a user's integrated circuit to describe a physical wire-load model in one embodiment of the invention.

The physical layout estimator 135 may receive the netlist, the floorplan, and the cell library including the physical library file to generate a timing delay representative of the parasitic resistance, parasitic capacitance, and fan out capacitance for each net. The delay calculator 130 may operate in different modes and generate different timing delays for a given net if different wire-load models are used. If the physical library file and the layout file are unavailable to determine a physical wire-load model, a synthesis library file may be used to determine a non-physical wire-load model and a timing delay for each net may be determined there from by the delay calculator 130. In any mode of operation, the timing delay may be coupled back into the logic synthesizer to more accurately simulate the timing of the logic and verify that it will meet timing specifications.

FIG. 5 is a block diagram illustrating an exemplary computer system 500 suitable for use with embodiments of the invention, including physical layout estimation, in accordance with an embodiment of the invention. In some embodiments of the invention, the computer system 500 may be used to implement computer programs, applications, methods, or other software to perform the above-described techniques for fabricating storage systems such as those described above. The computer system 500 may include a bus 502 or other communication mechanism for communicating information, which interconnects subsystems and devices, such as processor 504, system memory 506 (e.g., RAM), storage device 508 (e.g., ROM), disk drive 510 (e.g., magnetic or optical), communication interface 512 (e.g., modem or Ethernet card), display 514 (e.g., CRT or LCD), input device 516 (e.g., keyboard), and cursor control 518 (e.g., mouse or trackball).

According to some embodiments of the invention, computer system 500 performs specific operations by processor 504 executing one or more sequences of one or more instructions stored in system memory 506. Such instructions may be read into system memory 506 from another computer readable medium, such as static storage device 508 or disk drive 510. In some embodiments of the invention, hard-wired circuitry may be used in place of or in combination with software instructions to implement the invention.

The term "computer readable medium" refers to any medium that participates in providing instructions to processor 504 for execution. Such a medium may take many forms, including but not limited to, non-volatile media, volatile media, and transmission media. Non-volatile media includes, for example, optical or magnetic disks, such as disk drive 510. Volatile media includes dynamic memory, such as system memory 506. Transmission media includes coaxial cables, copper wire, and fiber optics, including wires that comprise bus 502. Transmission media can also take the form of acoustic or light waves, such as those generated during radio wave and infrared data communications.

Common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, carrier wave, or any other medium from which a computer can read.

In some embodiments of the invention, execution of the sequences of instructions to practice the invention is performed by a single computer system 500. According to some embodiments of the invention, two or more computer systems 500 coupled by communication link 520 (e.g., LAN, PSTN, or wireless network) may perform the sequence of instructions to practice the invention in coordination with one another. Computer system 500 may transmit and receive messages, data, and instructions, including program, i.e., application code, through communication link 520 and communication interface 512. Received program code may be executed by processor 504 as it is received, and/or stored in disk drive 510, or other non-volatile storage for later execution.

Although the foregoing embodiments of the invention have been described in some detail for purposes of clarity of understanding, implementations of the above-described system and techniques is not limited to the details provided. There are many alternative implementations and the disclosed embodiments are illustrative and not restrictive.

The above described embodiments of the invention may be practiced with other computer system configurations including microprocessor systems, microprocessor-based or programmable consumer electronics, minicomputers, mainframe computers and the like. Although the foregoing invention has been described in some detail for purposes of clarity of understanding, it will be apparent that certain changes and modifications may be practiced within the scope of the appended claims. Accordingly, the embodiments of the invention are to be considered as illustrative and not restrictive, and the invention is not to be limited to the details given herein, but may be modified within the scope and equivalents of the appended claims. Additionally, the elements and/or steps recited in the claims do not imply any particular order of operation, unless explicitly stated in therein.

What is claimed is:

1. A method for estimating timing delays in an integrated circuit design to optimize a circuit design during synthesis, the method comprising:
   generating a physical wire-load model to model parasitic capacitance and parasitic resistance per unit length of a net, the physical wire-load model responsive to a physical library;
   estimating a net length for each of the plurality of nets in the netlist of the integrated circuit design; and
   calculating, with a processor, a timing delay for each of the plurality of nets in the netlist in response to the parasitic capacitance per unit length, the parasitic resistance per unit length, and the net length estimate, wherein the calculating of the timing delay for each of the plurality of nets includes
      indexing into a parasitic capacitance look-up table with the net length estimate to determine the parasitic capacitance of each of the plurality of nets, and
      indexing into a parasitic resistance look-up table with the net length estimate to determine the parasitic resistance of each of the plurality of nets; and
      multiplying together the parasitic capacitance and the parasitic resistance for each of the plurality of nets.

2. The method of claim 1, wherein
the net length estimate is a product of a diagonal distance between driver and receiver, a base 2 log of fanout incremented by one, a function of site information, a function of wiring congestion, and a constant K.

3. The method of claim 1, wherein
placement information of logic gates is available, and
the net length estimate between a driver and one or more receivers is determined using a Steiner Tree.

4. The method of claim 1, wherein
the estimating of the net length for each of the plurality of nets in the netlist includes one or more of
   determining aspect ratio information of a cell, block, module, or macro-cell indicating its shape,
   determining height and width information of the cell, block, module, or macro-cell,
   determining enclosed area information of the cell, block, module, or macro-cell,
   determining placement information of the cell, block, module, or macro-cell, and
   determining congestion information of the net.

5. The method of claim 4, wherein
the estimating of the net length for each of the plurality of nets in the netlist further includes one or more of
   converting the aspect ratio information into an equivalent net length,
   converting the height and width information into an equivalent net length,
   converting the enclosed area information into an equivalent net length,
   converting the placement information into an equivalent net length, and
   converting the congestion information into an equivalent net length.

6. The method of claim 1, wherein
the estimating of the net length for each of the plurality of nets in the netlist further includes
   determining fanout information of a net, and
   converting the fanout information into an equivalent net length.

7. A method for estimating timing delays in an integrated circuit design to optimize a circuit design during synthesis, the method comprising:
   generating a physical wire-load model to model parasitic capacitance and parasitic resistance per unit length of a net, the physical wire-load model responsive to a physical library, wherein the generating of the physical wire-load model includes
      parsing the physical library to extract the parasitic resistance and the parasitic capacitance for each of a plurality of layers of wire interconnect,
      parsing the physical library to extract the minimum width for each of a plurality of layers of wire interconnect,
      averaging the parasitic resistance of the plurality of layers of wire interconnect with respect to the minimum widths to generate an average parasitic resistance per unit length, and
      averaging the parasitic capacitance of the plurality of layers of wire interconnect with respect to the minimum widths to generate an average parasitic capacitance per unit length;
   estimating a net length for each of the plurality of nets in the netlist of the integrated circuit design; and
   calculating, with a processor, a timing delay for each of the plurality of nets in the netlist in response to the parasitic capacitance per unit length, the parasitic resistance per unit length, and the net length estimate.

8. The method of claim 7, wherein
the net length estimate is a product of a diagonal distance between driver and receiver, a base 2 log of fanout incremented by one, a function of site information, a function of wiring congestion, and a constant K.

9. The method of claim 7, wherein
placement information of logic gates is available, and
the net length estimate between a driver and one or more receivers is determined using a Steiner Tree.

10. The method of claim 7, wherein
the estimating of the net length for each of the plurality of nets in the netlist includes one or more of
   determining aspect ratio information of a cell, block, module, or macro-cell indicating its shape,
   determining height and width information of the cell, block, module, or macro-cell,
   determining enclosed area information of the cell, block, module, or macro-cell,
   determining placement information of the cell, block, module, or macro-cell, and
   determining congestion information of the net.

11. The method of claim 10, wherein
the estimating of the net length for each of the plurality of nets in the netlist further includes one or more of
   converting the aspect ratio information into an equivalent net length,
   converting the height and width information into an equivalent net length,
   converting the enclosed area information into an equivalent net length,
   converting the placement information into an equivalent net length, and
   converting the congestion information into an equivalent net length.

12. The method of claim 7, wherein
the estimating of the net length for each of the plurality of
nets in the netlist further includes
determining fanout information of a net, and
converting the fanout information into an equivalent net length.

\* \* \* \* \*